United States Patent Office 3,214,455
Patented Oct. 26, 1965

3,214,455
CHARGE-TRANSFER COMPOUNDS AND
THEIR PREPARATION
Blaine C. McKusick and Owen Wright Webster, both of Wilmington, Del., assignors to E. I. du Pont de Nemours and Company, Wilmington, Del., a corporation of Delaware
No Drawing. Filed Oct. 16, 1961, Ser. No. 145,475
18 Claims. (Cl. 260—430)

This invention relates to new cyanocarbon compounds and to their preparation. More particularly, it relates to 1,1,2,3,4,4-hexacyano-2-butene and its salts; to hexacyano-1,3-butadiene and its preparation from tetracyanoethylene; and to charge-transfer compounds of hexacyano-1,3-butadiene.

The discovery of tetracyanoethylene opened the field of cyanocarbon chemistry. This compound was found to be highly reactive toward many other materials to yield a wide variety of cyano-containing products. For example, it was found that tetracyanoethylene could be reduced to symmetrical tetracyanoethane. Both hydrogens of this compound are acidic, and both normal and acid salts may be obtained from it as shown in U.S. Patent 2,788,356. In studying the reactions of tetracyanoethylene with other materials, it was found that in the essential absence of molecular oxygen, tetracyanoethylene reacts with metals to yield the corresponding metal tetracyanoethylenides. In these metal tetracyanoethylenides, the tetracyanoethylene moiety is in the form of an ion radical ($C_6N_4\dot{-}$) carrying a completely transferred electron so that the ion radical has an ionic charge of $-1$.

It has now been discovered that a novel and useful percyanocarbon, namely hexacyano-1,3-butadiene, can be prepared by (a) heating a metal tetracyanoethylenide or a metal salt of symmetrical tetracyanoethane at a temperature above about 30° C., to form a metal salt of 1,1,2,3,4,4-hexacyano-2-butene, and (b) oxidizing the salt of 1,1,2,3,4,4-hexacyano-2-butene to form hexacyano-1,3-butadiene. It appears probable that this oxidation takes place in two steps, the intermediate oxidized state being a metal hexacyano-1,3-butadienide in which the hexacyano-1,3-butadienide ion is in the form of an ion radical carrying a completely transferred electron.

Metal hexacyano-1,3-butadienides ($M[C_{10}N_6\dot{-}]$, where M is one equivalent of a metal) are not readily isolated in the above oxidation reaction and are more readily obtained by reaction of hexacyano-1,3-butadiene with one equivalent of a metal, preferably an alkali metal, or by the reaction of one mole of hexacyano-1,3-butadiene with one mole of a metal 1,1,2,3,4,4-hexacyano-2-butenediide to give two moles of the corresponding metal hexacyano-1,3-butadienide. If an excess of hexacyano-1,3-butadiene is used in either of these reactions, the hexacyano-1,3-butadienide ion radical first formed reacts further with an additional molecule or molecules of hexacyano-1,3-butadiene to form the metal salt of a monovalent ion-radical complex in which the complex ion contains one equivalent of the hexacyano-1,3-butadienide ion radical and one or more equivalents of neutral hexacyano-1,3-butadiene.

Hexacyano-1,3-butadiene is a strong pi electron acceptor (Lewis acid) and readily enters into charge-transfer type reactions with pi electron donors (Lewis bases) to yield charge-transfer compounds. Thus, hexacyano-1,3-butadiene reacts readily with any of the aromatic hydrocarbons, alkoxy substituted aromatic hydrocarbons, and other aromatic hydrocarbons with electron-donating substituents to produce charge-transfer compounds which are characteristically colored.

Hexacyano-1,3-butadiene is a colorless, crystalline solid melting at 253–255° C. It is readily soluble in acetonitrile, acetone, dioxane, tetrahydrofuran, ethyl acetate; sparingly soluble in benzene, dichloroethane, methylene chloride and chloroform; and substantially insoluble in water. Hexacyano-1,3-butadiene in acetonitrile solution shows a characteristic absorption maximum at 303 millimicrons with a molecular extinction coefficient of 19,000. Its infrared absorption spectrum shows absorption peaks at 4.45, 6.46, 8.14, 8.55, 9.67, 12.20, and 12.55 microns. The several reactions and products of this invention may be illustrated as follows:

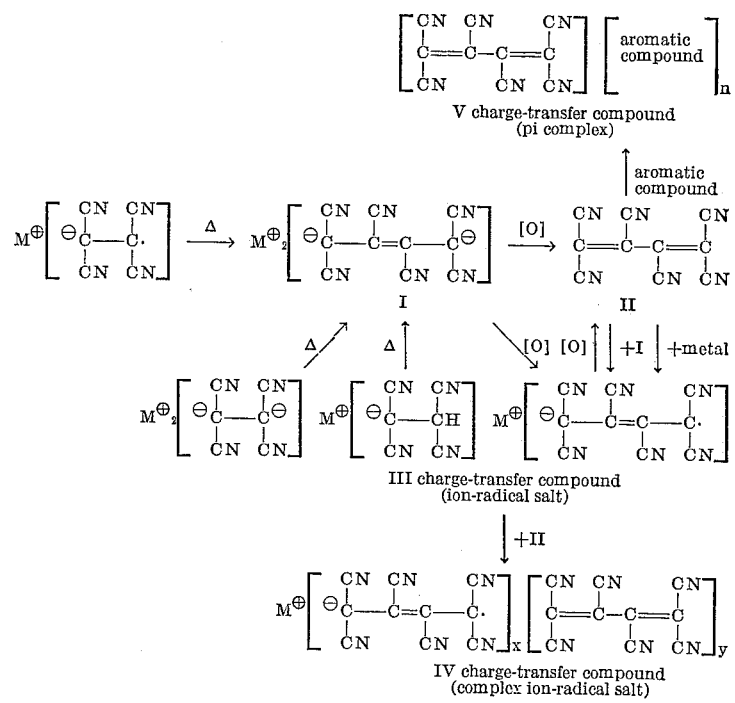

In the preceding formulas M⊕ is one equivalent of a cation (i.e., positive ion), $n$ is 1, 2 or 3 and $x$ and $y$ are cardinal numbers such as 1, 2, 3, etc.

The process for preparing a metal 1,1,2,3,4,4-hexacyano-2-butenediide from a metal tetracyanoethylenide or an acid or normal salt of symmetrical tetracyanoethane may be carried out over a wide range of temperatures, for example from 30° to 250° C. The reaction may be carried out by simple heating in the dry state and does not require the presence of any added materials. For example, the monosodium salt of symmetrical tetracyanoethane, $NaH(C_6N_4)$, is smoothly converted to disodium 1,1,2,3,4,4-hexacyano-2-butenediide by moderate heating at around 100° C. to drive off the hydrogen cyanide by-product. If desired, the reaction may also be carried out in a liquid organic reaction medium which is inert to the reactants and products such as 1,2-dimethoxyethane, tetrahydrofuran, and the like.

1,1,2,3,4,4-hexacyano-2-butene is readily prepared by treating an aqueous solution of one of its salts with an ion-exchange resin in the acid form as shown in Example XXXIX. 1,1,2,3,4,4-hexacyano-2-butene may be recovered by quick-freezing the resulting aqueous solution and vacuum drying by sublimation at low temperature, i.e., below −40° C. The compound is strongly acidic in the conventional sense.

Metal 1,1,2,3,4,4-hexacyano-2-butenediides are readily prepared from one another by metathesis. The alkali metal and alkaline earth metal salts are most readily prepared directly by the process described above. To prepare other salts from these, barium 1,1,2,3,4,4-hexacyano-2-butenediide is a particularly useful starting material. When an aqueous solution of this salt is treated with an aqueous solution of the sulfate of any other metal, barium sulfate is precipitated, leaving an aqueous solution from which the 1,1,2,3,4,4-hexacyano-2-butenediide of the other metal may be recovered by removal of water.

The process for preparing hexacyano-1,3-butadiene from a metal 1,1,2,3,4,4-hexacyano-2-butenediide involves reacting the salt with an oxidizing agent. There are no process variables that are critical. As shown in Example X the reaction may be carried out by simply bringing into intimate contact at room temperature the metal 1,1,2,3,4,4-hexacyano-2-butenediide and the oxidizing agent without the presence of any added materials and maintaining the contact until hexacyano-1,3-butadiene is formed. When the oxidizing agent is a solid, the two reactants may be brought into contact by grinding them together as in a ball mill. Temperatures far below as well as far above room temperature may be employed and temperatures between −100° C. and +300° C. are preferred for convenience. Optionally, the oxidation reaction may be carried out in the presence of a liquid reaction medium which is insert to the reactants and products, such as water, acetonitrile, carbon tetrachloride, and the like. The process is operable at pressures below and above atmospheric pressure and atmospheric pressure is most convenient.

Oxidizing agents which are operable for the conversion of a metal 1,1,2,3,4,4-hexacyano-2-butenediide to hexacyano-1,3-butadiene include those which have oxidation-reduction couples more negative than −0.70 volt (i.e., in the range from −0.70 to about −3.0) when measured in aqueous acid. This notation is according to the convention employed in "Oxidation Potentials," by Wendell M. Latimer, Prentice Hall, Inc., Second Edition, 1952, pages 340–345. For example, the oxidation-reduction couple ($E_o$) for bromine as expressed by the equation $$(2Br^- = Br_2(1) + 2e^-$$

is shown to have a value of −1.0652 volts, confirming that bromine is an operable oxidant.

In the processes for reacting hexacyano-1,3-butadiene with various agents to obtain the charge-transfer compounds of hexacyano-1,3-butadiene, there are no reaction variables which appear critical. The reactions take place readily at room temperature by bringing the reactants into intimate contact until the charge-transfer compound is formed. Temperatures far below and far above room temperature are operable and temperatures between −100° C. and the decomposition temperature of the reactants or products (or 300° C., whichever is lower) are preferred. No added ingredients are needed. It is sometimes convenient to carry out the reactions in the presence of a liquid reaction medium which is inert to the reactants and products, i.e., an organic liquid such as acetonitrile, 1,2-dimethoxyethane, tetrahydrofuran, and the like, but such use is optional. The preparation of charge-transfer compounds of hexacyano-1,3-butadiene may be carried out at pressures below and above atmospheric pressure and atmospheric pressure is most convenient.

The above remarks refer to processes for preparing charge-transfer compounds from hexacyano-1,3-butadiene by reacting it with (a) A metal
(b) A salt of 1,1,2,3,4,4-hexacyano-2-butene
(c) An inorganic metal salt, particularly an alkali or alkaline earth metal halide or cyanide
(d) A tertiary amine
(e) An aromatic compound, particularly an aromatic hydrocarbon, an alkoxy substituted aromatic hydrocarbon or another aromatic hydrocarbon with electron-donating substituents.

The charge-transfer compound obtained in reactions (a)–(d) is an ion-radical salt (III) or a complex ion radical salt (IV) depending on whether or not an excess of hexacyano-1,3-butadiene is employed. The charge-transfer compound obtained in reaction (e) involves only fractional charge-transfer of the pi complex type (V).

The present invention is generic to 1,1,2,3,4,4-hexacyano-2-butene, the normal and acid salts of 1,1,2,3,4,4-hexacyano-2-butene, hexacyano-1,3-butadiene, and the charge-transfer compounds of hexacyano-1,3-butadiene (referred to hereafter for brevity as HCBD) with Lewis bases broadly, including specifically organic and organo-inorganic Lewis bases. Charge-transfer compounds of previously known Lewis acids with Lewis bases are well known in the art. Frequently these charge-transfer compounds were referred to as pi complexes. More recently, the concept has become well established that such complexes are more properly described as charge-transfer compounds—see, for instance, Mulliken, J. Am. Chem. Soc. 74, 811 (1952). The charge-transfer compounds of HCBD with Lewis bases range in degree of charge transfer from those of true complex structure to those where actual and complete charge transfer exists in the ground electronic state. Compounds of the last-mentioned type constitute so-called anion-radical salts wherein at least one molecule of HCBD carries at least one transferred electron, and accordingly a negative electronic charge, and at least one molecule of the Lewis base component will have donated at least one electron to the HCBD component and will accordingly have an electron deficiency, and, therefore, a relatively more positive electronic charge. The invention is generic to those charge-transfer compounds of HCBD with Lewis bases which exhibit a detectable paramagnetic resonance absorption under normal conditions. It is likewise generic to HCBD charge-transfer compounds wherein the maximum charge-transfer occurs not in the ground electronic state but rather in the excited state (see Orgel, Quart, Rev. Chem., 8, 1422 (1954), for a discussion of this type of normally dimagnetic charge-transfer compounds).

The charge-transfer compounds of HCBD with Lewis bases can broadly be formulated as $$(M^{+n})_x[(HCBD)^{-}_y]^{nx}[(HCBD)^{\circ}_z]$$

wherein $n$ is the formal positive charge on the Lewis base cation M; $x$ is the number of said cation species present, which in the plural instance includes mixed individual cations; $nx$ is the total negative charge on the charged HCBD moieties, i.e., the charge-transfer compound is overall electronically neutral; $y$ is the number of negatively charged HCBD species present; and $z$ is the number of combined neutral species present, if any, where the combined neutral species are indicated by $^{\circ}$, $-$ indicates a negative ionic charge and $\cdot$ an electron, and $x$ and $y$ are numbers, alike or different, both whole and fractional, and generally from 1 to 6, and $z$ from 0 to 6. Thus, broadly speaking, these charge-transfer compounds can be described in two general types of the formulas $$(M^{+n})_x[(HCBD)^{-}_y]^{nx}$$

wherein there are no combined neutral species, and $$(M^{+n})_x[(HCBD)^{-}_y]^{nx}(HCBD)^{\circ}_{z'}$$

where $z'$ is a number from 1 to 6. A specific example is the tetraethylammonium charge-transfer complex salt $$(Et_4N)^{+}(HCBD)^{-}(HCBD)^{\circ}$$

The charge-transfer compounds include those with the simple monovalent anion radicals $(HCBD)^{-}$ in which one electron has been transferred per HCBD species. These can be illustrated by the structures $(M^{+n})_x[(HCBD)^{-}]_{nx}$, $$(M^{+n})_x[(HCBD)^{-}]_{nx}(HCBD)^{\circ}$$

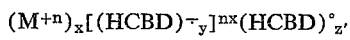

and the like.

The invention also obviously includes the charge-transfer compounds where more than one electron has been transferred in one or more HCBD moiety, e.g. of the type

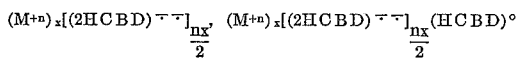

where $z$ is a number from 1 to 6, and the like.

These all represent electronic resonance hybrid structures. In the latter group different electronic configurations in the sense of the number of electrons involved per moiety differ but the overall charge of the complexes in all cases remains neutral. As is conventionally accepted, it is not intended to represent structurally all the resonance hybrids contributing to the stable ground state of any one of these charge-transfer compounds. For convenience and brevity throughout this specification, the single anion-radical representation will be used, i.e., in the format $(HCBD)^{-}$, and it is intended to include thereby all possibly contributing electronic resonance hybrid forms.

Also it is intended to include in these charge-transfer compounds, including compounds containing more than one cation per molecule, defect-type structures quite parallel to the well-known oxygen-deficient metal oxides, as well as metal-deficient metal oxides. Thus, these charge-transfer compounds include species which can be deficient in either or both the cation or anion portion. Furthermore, in the case of those compounds of the more complex charge-transfer compound structure wherein there is present in the ground state of the compound combined neutral HCBD moieties, these combined neutral moieties do not necessarily have to be integral. These combined neutral moieties can be present in both an integrally and/or non-integrally equivalent number to the anion-radical species, as well as an integrally or non-integrally greater or lesser equivalent than the anion-radical moieties. All such permutations in the stoichiometry and structure of these charge-transfer compounds will be discussed in greater detail with specific illustrations in the specification following the fully detailed exemplary disclosures.

Lewis bases which, with HCBD, form the necessary second component for forming the charge-transfer compounds of HCBD are well known to the chemical art (see G. N. Lewis, J. Franklin Institute, 226, 293 (1938), and following papers by Lewis and several coauthors). Broadly speaking, the Lewis base is, by definition, simply a molecule, the structure or configuration of which, electronically speaking, is so arranged that the molecule is capable of donating one or more electrons to a molecule which has an electron-deficient structure. Many and varied electron donor compounds are known. To list but a few well-recognized such classes there need only be named: the amines and various alkyl and aryl hydrocarbon-substituted amines which may be described structurally by the following two formulas:

where $R_1$, $R_2$, $R_3$ are H, alkyl, or alkylene up to 20 carbons and when $R_1$ is aryl, $R_2$ and $R_3$ are H or alkyl up to 20 carbons, and the corresponding quaternary ammonium salts as below,

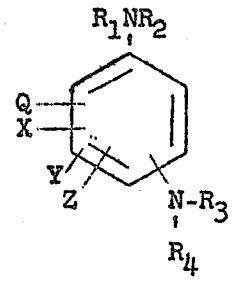

where the amino substituents are ortho or para to each other and $R_1$, $R_2$, $R_3$, $R_4$ are alkyl up to 20 carbons and Q, X, Y, Z are H or hydrocarbon up to 20 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q-X and/or Y-Z taken pairwise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved;

the phosphines and alkyl or aryl hydrocarbon-substituted phosphines:

where $R_1$, $R_2$, and $R_3$ are alkyl or aryl up to 20 carbons (the aryls being unsubstituted or having o- and p-directing substitutents),

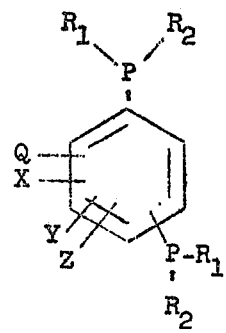

where $R_1$, $R_2$, Q, X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is involved;

the arsine and alkyl and aryl hydrocarbon-substituted arsines:

where $R_1$, $R_2$, and $R_3$ are as above in the phosphine analogs,

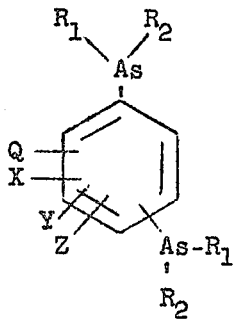

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions is involved;

the stibines and alkyl and aryl hydrocarbon-substituted stibines:

where $R_1$, $R_2$, and $R_3$ are as above in the arsine analogs,

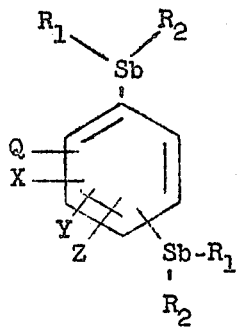

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved;

the quaternary ammonium bases or their salts, such as $R_1R_2R_3R_4N^+$ where $R_1$, $R_2$, $R_3$, and $R_4$ are H or alkyl up to 20 carbons, metal cations describable by $M^{+x}$ where M is a metal and $x$ is the formal cationic valence of the metal; metal chelates having all planar configurations, the atoms which coordinate with the metal being joined by a conjugated system of double bonds (aromatic or open chain); aromatic or heterocyclic aromatic amino-phenols or ethers, the O and N atoms being connected by a conjugated system of double bonds; aromatic hydrocarbon or alkyl-substituted aromatic hydrocarbons including polynuclear ones; and polyhydric phenols and ethers thereof.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammoiodides, e.g., morpholine hydroiodide; all heterocycles containing nuclear nitrogen and the hydroiodides or alkyl iodide salts thereof; substituted ethylenes of the type

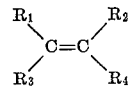

wherein from one to four of the $R_1$, $R_2$, $R_3$, or $R_4$ groups are amino or alkylamino, any remaining being alkyl, alkoxy, alkylthio, aryl, aryloxyl, or arylthio; and the hydroiodide or alkyl iodide salts thereof, including the plain iodides, e.g., of the aminium type $R_3N.^+I^-$;

and the Wurster iodides of aromatic amines, e.g., Wurster's blue iodide,

(In the foregoing diamines, it is expressly intended to include polynuclear diamines in which the nitrogens are connected by a conjugated system.)

In all the foregoing instances, the molecular structure in the hydrocarbon moieties can also carry functional substituents. The preferred substituents can be classed as those which, when present on ring carbon of an aromatic nucleus, tend to direct any entering substituent radical into the ortho- or para-position, i.e., the so-called orth-para orienting groups. These substituents have also been described by Price, Chem. Rev., 29, 58 (1941), in terms of the electrostatic polarizing force as measured in dynes of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 10 carbons; substituted alkyl up to 10 carbons, e.g., aminoalkyl, hydroxyalkyl, alkoxyalkyl, vinylalkyl, haloalkyl; hydroxy; alkoxy up to 10 carbons; thiol, alkyl thiol (up to 10 carbons); amino; N-alkylamino or N,N-dialkylamino with alkyls up to 10 carbons; N-monoarylamino; and the like.

Suitable specific Lewis bases for making the HCBD/Lewis base charge-transfer compounds in molar ratios from 2/1 to 1/2 are given in the following list. In connection with the molar ratios just given, it is to be understood that the present charge-transfer compounds lie within the arithmetical range of the two molar ratio extremes and not solely at the extremes. Thus, charge-transfer compounds of the present invention are inclusive of, for instance, 4/2, 3/2, 1.5/1, and the like HCBD/Lewis base charge-transfer compounds. Useful specific Lewis bases include: ammonia, and amines, such as ethylamine, methylamine, dibutylamine, tridecylamine, eicosylamine, and the like; diamines, such as 2,3-N,N,N',N'-hexamethyl-p-phenylenediamine, N,N'-dioctyl - 1,5 - diaminonaphthalene, 1,4-diamino-5,6,7,8-tetrahydronaphthalene, and the like; phosphines and diphosphines, such as triphenylphosphine, tributylphosphine, ethyldioctylphosphine, 1,4-bis(diethylphosphino)benzene, and the like; ammonium and quaternary ammonium salts, such as ammonium iodide, ethyltrimethylammonium iodide, dioctylammonium iodide, methyltri-n-propylammonium iodide, and the like; metals, such as Na, K, Li, Ag, Cu, and the like; metal precursors, such as the carbonyls, iodides, cyanides, e.g., iron and cobalt carbonyls, iodides, cyanides, and the like; metal chelates, such as copper salicylaldimine, cobalt pyrrolealdehydeimine, nickel 4 - methoxysalicylaldoxime, copper 5-methoxy-8-quinolinoate, and the like; heterocyclic aromatic amines, phenols, and ethers, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; aromatic hydrocarbons and alkyl substituted aromatic hydrocarbons, including polynuclear, such as chrysene, coronene, hexamethylbenzene, 2-ethylphenanthrene, and the like.

The charge-transfer complexes of HCBD with pi or Lewis bases are generically colored, usually with characteristic deep shades of color. Accordingly, the formation of these complexes with HCBD is basis for a method involving the detection and identification of Lewis bases. The charge-transfer complexes have other uses, both per se and again in the formation thereof. Thus, the HCBD Lewis base complexes with the stronger Lewis bases are paramagnetic and thus have usefulness in recognized uses for paramagnetic materials. These paramagnetic complexes are generically characterized by exhibiting paramagnetic absorption in the electron paramagnetic resonance spectrum (EPR absorption).

The HCBD charge-transfer complexes are generically colored and accordingly find use in any of the many well-known and established uses for colored materials. Thus, in the case of the colored solutions, these are useful in obtaining decorative color effects. In the case of the HCBD charge-transfer complexes with stronger Lewis bases, the complexes are colored solids irrespective of whether the complex is paramagnetic or not. These colored solid complexes find use in any of the many well-established fields, such as dyes and pigments, for both paints and plastics, and colored fillers for the latter.

Since all the HCBD charge-transfer complexes are colored, the controlled formation thereof forms the basis for still another use, viz., the reproduction of text matter by impact printing, i.e., by the pressure formation of graphic images. Thus, one sheet of a carrier, e.g., paper, is dusted with powdered HCBD or impregnated with a solution of HCBD and the solvent removed via evaporation, leaving the HCBD deposited in, on, and through the paper carrier. Another separate sheet of paper is similarly so treated with a Lewis base. A laminate of the two sheets will reproduce a colored image in the second sheet made by pressure on the first sheet.

The present invention is also generic to the charge-transfer compounds of HCBD with organic and organo-inorganic Lewis bases in crystalline form, including both microcrystal and single crystal form. This latter term is used in its art-recognized sense as meaning an integral body of solid matter containing an ordered periodic arrangement of atoms which extends unchanged throughout the body without discontinuity or change of orientation. As is apparent from the foregoing, these HCBD/organic or organo-inorganic Lewis base charge-transfer compounds can readily be prepared by contacting HCBD with the appropriate Lewis base, generally in an inert reaction medium. If the reaction is carried out quickly and at modest temperatures, the charge-transfer compounds are obtained in a polycrystalline state, i.e., as a mass of microcrystals. If, however the crystals are permitted to form slowly from the inert medium, for instance, by mixing solutions of HCBD and the appropriate Lewis base, preferably at elevated temperatures, and slowly permitting the reaction medium to cool, single crystals of the HCBD/Lewis base charge-transfer compounds can readily be obtained.

Suitable appropraite inert solvents for use in preparing the HCBD/organic or organo-inorganic Lewis base charge-transfer compounds include the aliphatic and cycloaliphatic ethers, generally the saturated hydrocarbon ethers of preferably eight or more carbon atoms, e.g., di-n-butyl ether and the like (the shorter chain ethers, e.g., diethyl ether, di-n-propyl ether, and the like can frequently be used advantageously in admixture with the longer chain ethers as a means of controlling the solubility/insolubility relationship); the alkylene ethers, cyclic, of generally up to ten carbons such as tetrahydrofuran, tetrahydrosylvan, 1,4-dioxane, and the like; the alkylene and polyalkylene polyethers of generally more than four carbon atoms, e.g., ethylene glycol dimethyl ether, diethylene glycol dimethyl ether, ethylene glycol diethyl ether, diethylene glycol diethyl ether, and the like; the aliphatic and cycloaliphatic nitriles, generally of up to ten carbon atoms, e.g., acetonitrile, propionitrile; halogenated alkanes having at least one proton, e.g., chloroform, methylene chloride; and the like.

In the examples which follow, parts are by weight unless otherwise specified.

Example I

Part A: A mixture of 3,000 parts of dry potassium iodide and 1,700 parts of tetracyanoethylene is placed in a glass reactor. The air in the reactor is replaced with nitrogen. About 39,200 parts of acetonitrile is added and the resulting suspension is agitated for four hours at room temperature. Filtration yields 1,140 parts of potassium tetracyanoethylenide in the form of bronze-colored crystals. It is purified by recrystallization from acetonitrile.

Part B:

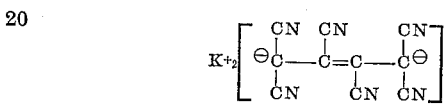

A solution of 537 parts of potassium tetracyanoethylenide in 5,238 parts of 1,2-dimethyloxyethane is refluxed for two weeks in a nitrogen atmosphere. The mixture is cooled and 160 parts of dipotassium hexacyanobutenediide which form is collected on a filter and dried. The brown solid is purified by chromatography by placing a saturated solution of the product in 1:1 methanol-acetonitrile on a column of neutral alumina and developing with 1:1 methanol-acetonitrile. The developed column is extruded and the broad, orange middle band collected and washed with water. On evaporation of the water, there remains 37 parts of dipotassium 1,1,2,3,4,4-hexacyano-2-butenediide. It is purified by recrystallization three times from water. The infrared absorption spectrum shows bands at 4.51, 4.60, 4.67, 6.60, 6.75, 7.92, 8.14, 9.75, and 12.40 microns. In acetonitrile solution, this compound shows absorption peaks at 225, 322, and 487 millimicrons with corresponding molecular extinction coefficients of 18,150, 5,770, and 15,950, respectively.

*Analysis.*—Calcd. for $C_{10}N_6K_2$: C, 42.54; N, 29.77. Found: C, 42.68, 42.59; N, 30.14, 30.43.

Example II

A suspension of 63 parts of sodium hydride-mineral oil dispersion (56.5% NaH) in 437 parts of 1,2-dimethoxyethane is cooled in an ice-salt water bath under nitrogen and stirred vigorously. A solution of 98 parts 1,1,2,2-tetracyanoethane in 350 parts of 1,2-dimethoxyethane is added in a slow stream over the course of two hours. The hydrogen gas which evolves is vented. The resulting white suspension of disodium 1,1,2,2-tetracyanoethanediide (containing two moles of 1,2-dimethoxyethane solvate and at least a catalytic amount of monosodium 1,1,2,2-tetracyanoethanide) is refluxed (about 80° C.) for one hour. The color of the mixture changes to a deep orange and an oily phase separates. The mixture is cooled to room temperature, and the top layer containing solvent and mineral oil is decanted and discarded. The remaining oil is shaken with 392 parts of acetonitrile and filtered. Sodium cyanide (37 parts) remains on the filter. The orange filtrate is evaporated to dryness and the residue is refluxed two hours in 392 parts of acetonitrile. The mixture is cooled to room temperature and 50 parts of trans disodium 1,1,2,3,4,4-hexacyano-2-butenediide is collected on a filter and identified by its infrared spectrum. Dilution of the acetonotrile solution with 2,140 parts of dry ether causes 47 parts of cis disodium 1,1,2,3,4,4-hexacyano-2-butenediide to crystallize. The cis structure is confirmed on the basis of its infrared spectrum. Heating an acetonitrile solution of the cis product causes trans disodium 1,1,2,3,4,4-hexacyano-2-butenediide to precipitate.

Example III

A solution of 200 parts of tetracyanoethane in 4,365 parts of 1,2-dimethoxyethane is added slowly to a suspension of 66 parts of sodium hydride-mineral oil dispersion (56.5% NaH). The yellow solution of monosodium tetracyanoethylenide which forms is agitated for two hours at room temperature. It is then heated at reflux for one hour. The reaction mixture is filtered and the filtrate evaporated to dryness. The residue is washed with ether and then dissolved in acetonitrile. The acetonitrile solution is filtered and the filtrate evaporated to dryness to yield 60 parts of cis disodium 1,1,2,3,4,4-hexacyano-2-butenediide which is identified by its infrared absorption spectrum.

Example IV

A solution of 250 parts of disodium 1,1,2,2-tetracyanoethanediide (containing two moles of 1,2-dimethoxyethane solvate and at least a catalytic amount of monosodium 1,1,2,2-tetracyanoethanide) in 4,715 parts of dimethylacetamide is refluxed for four hours (about 160° C.). The resulting product is filtered and the filtrate diluted with 35,675 parts of ether. An oil separates and is collected and diluted with 15,656 parts of acetonitrile. The solution is filtered and the filtrate evaporated to dryness. The dry residue, containing disodium 1,1,2,3,4,4-hexacyano-2-butenediide, is dissolved in water and treated with excess silver nitrate solution. Orange disilver 1,1,2,3,4,4-hexacyano-2-butenediide, 89 parts, precipitates and is characterized by its infrared spectrum.

Example V

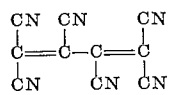

A suspension of 230 parts of disilver 1,1,2,3,4,4-hexacyano-2-butenediide in 3,914 parts of acetonitrile under nitrogen is treated with 140 parts of iodine at room temperature. The silver iodide which precipitates is removed by filtration and the filtrate is evaporated to dryness. The residue is heated at 130–160° C./0.1 mm. and 15 parts of colorless hexacyano-1,3-butadiene is collected by sublimation. It is purified by recrystallization from benzene. In acetonitrile solution, this compound shows absorption peaks at 4.45, 6.46, 8.14, 8.55, 9.67, 12.20, and 12.55 microns. The infrared absorption spectrum shows a maximum at 303 millimicrons with a molecular extinction coefficient of 19,000.

*Analysis.*—Calcd. for $C_{10}N_6$: C, 58.82; N, 41.17. Found: C, 58.45; N, 41.68.

Example VI

A suspension of 457 parts of disilver 1,1,2,3,4,4-hexacyano-2-butenediide in 7,828 parts of acetonitrile is cooled to −40° C. under nitrogen and 178 parts of bromine is added. The solution is stirred and allowed to warm to room temperature over the course of one-half hour. The silver bromide which precipitates is removed by filtration. The filtrate is evaporated to dryness and the residue is heated at 130–140° C./0.1 mm. Hexacyano-1,3-butadiene, 79 parts, sublimes and is identified by its characteristic infrared spectrum.

Example VII

Concentrated nitric acid, 1,420 parts, is added in one portion to a solution of 122 parts of disodium 1,1,2,3,4,4-hexacyano-2-butenediide dissolved in 500 parts of water at 0° C. Hexacyano-1,3-butadiene, 45 parts, is collected on a filter and washed with water. Its identity is confirmed by its infrared spectrum.

Example VIII

A suspension of 122 parts of trans disodium 1,1,2,3,4,4-hexacyano-2-butenediide is agitated for 15 minutes at room temperature in 7,975 parts of carbon tetrachloride containing 200 parts of bromine. The white suspension of hexacyano-1,3-butadiene and sodium bromide is removed by filtration. The sodium bromide is removed by washing with water. Hexacyano-1,3-butadiene (68 parts) remains and is identified by its infrared spectrum.

Example IX

A suspension of 122 parts of cis disodium 1,1,2,3,4,4-hexacyano-2-butenediide is agitated for 15 minutes at room temperature in 7,975 parts of carbon tetrachloride containing 200 parts of bromine. The white suspension of hexacyano-1,3-butadiene and sodium bromide is removed by filtration. The sodium bromide is removed by washing with water. Hexacyano-1,3-butadiene (40 parts) remains and is identified by its infrared spectrum.

Example X

Dry disodium 1,1,2,3,4,4-hexacyano-2-butenediide, 122 parts, is packed in a glass tube and a dry mixture of bromine vapor and nitrogen is passed through the tube at room temperature. The color of the dry powder changes from orange to white. The product is then removed from the tube and washed with water to remove sodium bromide. Hexacyano-1,3-butadiene, 60 parts, remains and is identified by its infrared spectrum.

Examples XI–XIV

Hexacyano-1,3-butadiene reacts readily with any of the aromatic hydrocarbons, alkoxy substituted aromatic hydrocarbons, or other aromatic hydrocarbons with electron-donating substituents to produce the corresponding charge-transfer compounds containing molecules of hexacyano-1,3-butadiene and the aromatic compound bound together primarily by overlapping Pi orbitals. These Pi complexes are visibly colored, and the colors are characteristic of the particular aromatic compound involved. In Examples XI–XIV, hexacyano-1,3-butadiene is dissolved in approximately 100 times its weight of the indicated aromatic compound. The color shown for the charge-transfer compound is formed immediately.

| Example | Aromatic Compound | Charge-transfer Compound Formed | Color of Solution |
|---|---|---|---|
| XI | Benzene | $(C_{10}N_6)(C_6H_6)$ | Yellow-orange. |
| XII | Toluene | $(C_{10}N_6)(C_6H_5CH_3)$ | Red. |
| XIII | Xylene | $(C_{10}N_6)[C_6H_4(CH_3)_2]$ | Purple. |
| XIV | Anisole | $(C_{10}N_6)(C_6H_5OCH_3)$ | Blue. |

Example XV

A solution of 202 parts of pyrene and 102 parts of hexacyano-1,3-butadiene in 3,131 parts of acetonitrile is black in color. This solution is evaporated to approximately one fourth its original volume. Hexacyano-1,3-butadiene/(pyrene)₂ charge-transfer compound crystallizes as black needles (130 parts, M.P. 188–195° C.). The product is collected on a filter and dried for 20 hours at 0.3 mm. Its electrical resistivity is $3.1 \times 10^9$ ohm-cm. This product shows an EPR absorption signal both in the solid phase and in solution in methylene chloride.

*Analysis.*—Calcd. for $C_{42}H_{20}N_6$: C, 82.90; H, 3.32; N, 13.85. Found: C, 83.07; H, 3.38; N, 14.03.

Example XVI

A solution of 162 parts of hexamethylbenzene and 202 parts of hexacyano-1,3-butadiene in 783 parts of acetonitrile and 1,257 parts of 1,2-dichloroethane is evaporated to about one fourth its original volume. Hexacyano-1,3-butadiene/(hexamethylbenzene)₂ charge-transfer compound (260 parts) crystallizes as black needles (M.P. 145° C. with decomposition). The product is dried at 0.3 mm. for eight hours. The electrical resistivity is $7.0 \times 10^{10}$ ohm-cm. This product shows an EPR absorption signal both in the solid phase and in solution in methylene chloride.

*Analysis.*—Calcd. for $C_{34}H_{36}N_6$: C, 77.24; H, 6.86; N, 15.90. Found: C, 76.89; H, 6.74; N, 16.52.

Example XVII

The association constant for the formation of the charge-transfer compound between hexacyano-1,3-butadiene and benzene is determined in methylene chloride solution according to the procedure of Merrifield and Phillips, J. Am. Chem. Soc., 80, 2778–82 (1958). In this determination K is found to be 1.02. Determinations are made at several concentrations and a plot of y vs. 1/[B] is linear, showing that the charge-transfer compound present is the 1:1 compound $(C_{10}N_8)(C_6H_6)$. The solutions show an absorption peak at 440 millimicrons with a molecular extinction coefficient of 4400.

Example XVIII

The association constant for the formation of the charge-transfer compound between hexacyano-1,3-butadiene and pyrene is determined in methylene chloride solution as in Example XVII and found to be 42. The plot of y vs. 1/[B] is linear, showing that the 1:1 charge-transfer compound $(C_{10}N_6)(C_{16}H_{10})$ is present. The solutions show absorption peaks at 1010, 605, and 420 millimicrons with respective molecular extinction coefficients of 3700, approximately), 2630, and 3698.

Example XIX

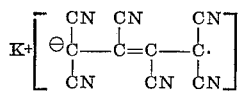

A solution of 20 parts of hexacyano-1,3-butadiene in 78,280 parts of acetonitrile is added to a solution of 28 parts of dipotassium 1,1,2,3,4,4-hexacyano-2-butenediide in 78,280 parts of acetonitrile under nitrogen at room temperature. The color changes from light orange to violet with the formation of potassium hexacyano-1,3-butadienide. The EPR spectrum of the solution consists of 45 lines, which is the predicted spectrum for the hexacyano-1,3-butadienide ion. The signal strength indicates a high yield.

Example XX

A mixture of 250 parts of disodium 1,1,2,3,4,4-hexacyano-2-butenediide and 202 parts of hexacyano-1,3-butadiene is stirred in 15,656 parts of acetonitrile for one-half hour. The solution is filtered and the filtrate evaporated to approximately 15% of its original volume. Sodium hexacyano-1,3-butadienide (175 parts) crystallizes and is collected on a filter and washed with acetonitrile. The product is dried at 80° C./0.3 mm. for three hours. The infrared absorption spectrum contains bands at 4.45, 4.52, 6.75, and 7.30 microns. The resistivity of the product is $4.4\times10^7$ ohm-cm. The solid product is black. Solutions, however, are dark violet. An acetonitrile solution shows absorption peaks at 475 and 505 millimicrons with molecular extinction coefficients of 15,300 and 35,700 respectively.

*Analysis.*—Calcd. for $C_{10}N_6Na$: C, 52.88; N, 37.00. Found: C, 52.77; N, 37.17.

Example XXI

A solution of 25 parts of disodium, 1,1,2,3,4,4-hexacyano-2-butenediide in 873 parts of 1,2-dimethoxyethane is added to a solution of 25 parts of tetraethylammonium chloride monohydrate in 437 parts of 1,2-dimethoxyethane and 391 parts of acetonitrile. The solution is stirred two hours and then filtered to remove sodium chloride. The filtrate is evaporated to dryness and the residue is recrystallized from dichloroethane. Tetraethylammonium 1,1,2,3,4,4-hexacyano-2-butenediide (21 parts, M.P. 72–74° C.) is isolated as orange needles. The product is characterized by its infrared spectrum.

Example XXII

A mixture of 500 parts of tetraethylammonium 1,1,2,3,4,4-hexacyano-2-butenediide and 218 parts of hexacyano-1,3-butadiene is dissolved in 3,914 parts of acetonitrile. The solution is evaporated to approximately 40% its original volume and 240 parts of tetraethylammonium hexacyano-1,3-butadienide crystallizes. The product is collected on a filter and recrystallized from 1,2-dichloroethane to yield long black needles which melt at 153–159° C. with decomposition. The infrared absorption spectrum contains bands at 3.30, 4.52, 6.70, 6.95, 7.18, 7.30, 8.53, 9.50, 9.75, 10.00, and 12.75 microns which is in agreement with the tetraethylammonium ion and the hexacyano-1,3-butadienide ion radical.

*Analysis.*—Calcd. for $C_{18}H_{20}N_7$: C, 64.64; H, 6.03; N, 29.32. Found: C, 64.66; H, 5.90; N, 29.06.

Example XXIII

A drop of mercury is added to a 1% solution of hexacyano-1,3-butadiene in acetonitrile. The characteristic violet color of the hexacyano-1,3-butadienide ion radical develops, due to the formation of mercurous hexacyano-1,3-butadienide.

Examples XXIV to XXIX

In Examples XXIV to XXIX a molecular excess of the indicated metal in finely divided form is placed in a dilute solution of hexacyano-1,3-butadiene in acetonitrile (e.g., one part of hexacyano-1,3-butadiene in 78,280 parts of acetonitrile) and the mixture is agitated at room temperature. The violet color characteristic of the hexacyano-1,3-butadienide ion quickly appears. When no further deepening of the color is observed, the agitation is stopped and the yield of the indicated product, based on hexacyano-1,3-butadiene, is determined spectroscopically.

| Example | Finely Divided Metal | Product | Yield, percent |
|---|---|---|---|
| XXIV | Lead | $Pb(C_{10}N_4\overline{\cdot})_2$ | 58 |
| XXV | Zinc | $Zn(C_{10}N_4\overline{\cdot})_2$ | 56 |
| XXVI | Copper | $Cu(C_{10}N_4\overline{\cdot})$ | 33 |
| XXVII | Mercury | $Hg(C_{10}N_4\overline{\cdot})_2$ | 59 |
| XXVIII | Magnesium | $Mg(C_{10}N_4\overline{\cdot})_2$ | 40 |
| XXIX | Tin | $Sn(C_{10}N_4\overline{\cdot})_2$ | 26 |

Example XXX

To a $10^{-3}$ molar solution of hexacyano-1,3-butadiene in acetonitrile is added a molecular excess of solid sodium iodide. Within a few minutes at room temperature the solution turns dark violet in color with the formation of sodium hexacyano-1,3-butadienide.

Example XXXI

To a $10^{-3}$ molar solution of hexacyano-1,3-butadiene in acetonitrile is added a molecular excess of solid sodium bromide. Within a few minutes at room temperature the solution turns dark violet in color with the formation of sodium hexacyano-1,3-butadienide.

Example XXXII

To a $10^{-3}$ molar solution of hexacyano-1,3-butadiene in acetonitrile is added a molecular excess of solid sodium cyanide. Within a few minutes at room temperature the solution turns dark violet in color with the formation of sodium hexacyano-1,3-butadienide.

Example XXXIII

To a $10^{-3}$ molar solution of hexacyano-1,3-butadiene in acetonitrile is added a molecular excess of triethylamine. Within a few minutes at room temperature the solution turns dark violet in color with the formation of triethylammonium hexacyano-1,3-butadienide.

Example XXXIV

A piece of porous white paper is dusted with powdered hexacyano-1,3-butadiene and another piece of such paper is dusted with powdered disodium 1,1,2,3,4,4-hexacyano-2-butenediide. The two pieces of paper are placed with the dusted faces together and are written on with a blunt metal stylus which leaves no mark of itself. The writing appears in black on the back side of the sheet written on, with the formation of sodium hexacyano-1,3-butadienide.

*Example XXXV*

A piece of porous white paper is dusted first with powdered hexacyano-1,3-butadiene and then with powdered pyrene. The paper remains white. The paper is written on with a blunt metal stylus and the written marks show up as green with the formation of the hexacyano-1,3-butadiene/pyrene charge-transfer compound.

*Example XXXVI*

Sodium iodide is substituted for pyrene in the procedure of Example XXXV. The writing shows up black with the formation of sodium hexacyano-1,3-butadienide.

*Example XXXVII*

Disodium 1,1,2,3,4,4-hexacyano-2-butenediide is substituted for pyrene in the procedure of Example XXXV. The writing shows up black with the formation of sodium hexacyano-1,3-butadienide.

*Example XXXVIII*

A solution of 490 parts of sodium hexacyano-1,3-butadienide in 100,000 parts of water is treated with a solution of 440 parts of tetraethylammonium chloride in 2,000 parts of water. Tetraethylammonium hexacyano-1,3-butadienide (192 parts) precipitates as a black solid which is purified by recrystallization from dichloromethane and identified by its infrared absorption spectrum.

*Example XXXIX*

A solution of 50 parts of trans disodium 1,1,2,3,4,4-hexacyano-2-butenediide in 1,000 parts of water is passed through a column of an ion-exchange resin in acid form (Amberlite IR–120). The resulting solution of 1,1,2,3,4,4-hexacyano-2-butene is substantially free of sodium ion (flame test) and is strongly acidic.

*Example XL*

A solution of 30 parts of bromine and 55 parts of concentrated sulfuric acid in 2,000 parts of water is agitated at 0° C. and a solution of 100 parts of disodium 1,1,2,3,4,4-hexacyano-2-butenediide in 2,000 parts of water is added gradually over a period of ten minutes, the temperature of the mixture being maintained at 0° C. The precipitate which forms is collected by filtration, dried and recrystallized from 1,2-dichloroethane to yield 35 parts of hexacyano-1,3-butadiene which is identified by the formation of its charge-transfer compounds (red solution in toluene, purple solution in xylene).

There are two broad types of charge-transfer compounds of hexacyano-1,3-butadiene: (1) those wherein the hexacyano-1,3-butadiene (HCBD) is present wholly in anion-radical form, i.e., charge-transfer compounds of the type $(M^{+n})_x[(HCBD)_y^{\div}]^{nx}$, where M is a cation (organic and/or inorganic) of positive valence $n$, $n$ is an integer from 1 to 6, and $x$ and $y$ are numbers, alike or different, both whole and fractional, and generally from 1 to 6, and (2) those wherein the charge-transfer compound contains some of the HCBD in anion-radical form and some present in the complex in neutral, i.e., uncharged, form. This latter type of charge-transfer compound is representable by the formula $$(M^{+n})_x[(HCBD)_y^{\div}]^{nx}(HCBD)_{z'}^{\circ}$$

where M, $n$, $x$ and $y$ are defined above and $z'$ is a number of from 1 to 6. In this latter type of compound containing the combined neutral HCBD, while most of the structures will contain unitized stoichiometric quantities of the said neutral radicals, it is intended that these disclosures are to include the usually possible defect structures wherein either or both the anion or cation will be present in less than stoichiometric quantities with suitable adjustment in the combined quantity of the neutral HCBD. To illustrate, the invention is equally inclusive of an $R^+/HCBD^{\div}/HCBD^{\circ}$ as it is of an

compound.

The charge-transfer compounds of the present invention, comprising the first-discussed class wherein the HCBD moiety is present wholly in anion-radical form, are best described as simple salts of the HCBD anion-radical, i.e., $HCBD^{\div}$. These simple salts can be prepared directly by simple interaction between a suitable source of the cation and the HCBD, or, preferably, by metathetical reaction between a suitable source of a cation and a conveniently soluble source of the HCBD anion-radical, e.g., sodium HCBDide which is easily preparable directly from a suitable sodium salt, e.g., sodium iodide, and HCDB, and has the advantage in further methathetical reactions of good solubility as the simple salt plus the further significant advantage that the by-product sodium salts arising from the metathesis are also usually highly soluble so that they remain in solution while the much less soluble desired charge-transfer product precipitates. In the case of the simple anion-radical salts involving organic cations, the organic quaternary halides are most generally operable. Simple hydrohalide salts of the organic cations often fail to give the simple product because of formation of free HCBD resulting in the formation of the complex charge-transfer compounds of the second type, discussed above, containing combined neutral HCBD. However, in the case of the strongly basic organic cations, speaking in the sense of basicity as conferred by an unshared pair of electrons, the organic cation hydrohalide salts are fully operable in the metathesis to give the simple salts. To be specific, for instance, the tris(lower alkyl)-ammonium hydrohalide salts are fully operable to give the simple salts.

In the case of the inorganic simple anion-radical salts because of lower reactivity and increased solubility problems, the metathetical reaction is the method of choice. Thus, for practically all the inorganic simple HCBDide salts, the preferred starting point will involve the preparation of sodium HCBDide, most generally from sodium iodide and HCBD, followed by the subsequent metathetical interchange between the sodium HCBDide and a suitable soluble source of the desired inorganic cation.

Most of these simple anion-radical salts, including both the organic and inorganic type, are completely ionic. However, the invention is inclusive of a broader scope for these simple anion-radical salts in that it includes compounds of very weak charge-transfer bonding, more properly described as pi complexes, as well as the previously discussed wholly ionic, electrostatically bonded charge-transfer compounds with complete charge transfer. Thus, the invention is also inclusive of the anion-radical salts of the Wurster-type involving cation radicals. Depending on the base strength, as previously defined, of the cation moiety and the cation radical, these simple salts will involve full charge transfer, i.e., be anionic, or only partial charge transfer of the pi complex type. Thus, bis-(dimethylammonium) bis(dimethylamino)ethylene diiodide with two molar proportions of sodium HCBDide forms the full charge-transfer dianion-diradical salt, bis-dimethylammonium) bis(diethylamino)ethylene bis(HCBDide); whereas, 1 - dimethylammonium-4-dimethylaminobenzene perchlorate, i.e., N,N,N',N' - tetramethyl - p-phenylenediamine monoperchlorate, in metathesis with sodium HCBDide forms the 1/1 tetraethyl - p - phenylenediamine/HCBD pi complex.

The metathetical reactions will generally be carried out with the sodium HCBDide, or whatever other soluble source of the HCBD anion-radical is being used, in solution in a suitable solvent, to which solution will be added a solution of a source of the cation involved in the same or other suitable solvent. For organic systems, ethanol or ethanol/acetonitrile mixtures are preferred in practice because of favorable solubility relationships. Sodium HCBDide is soluble in ethanol and many organiz salts are soluble in ethanole and acetonitrile. In general, alcohols and alkyl nitrile are operable and in some cases water can be used. In general, materials such as ethers (e.g., tetrahydrofurans) or choloroalkanes (e.g., methylene dichloride) are to be avoided here since, although they may be solvents for the organic halide, they are non-solvents (precipitants) for the sodium HCBDide and thus would precipitate it before the desired reaction could occur. Also, they are nonsolvents for the by-product sodium salts and so would precipitate them along with the product even if reaction did occur; this could cause purification and separation problems of serious proportions.

Water or water/alcohol mixtures are preferred for reactions with inorganic salts since here water or preponderantly aqueous systems are virtually the only satisfactory solvent for the inorganic starting material. Here the $HCBD^-$ salts will often be obtained in a hydrated state, especially with transition metals which have a strong coordinating tendency.

The upper temperature limit is defined by the atmospheric pressure boiling point of the highest boiling solvent if and when a mixture is used (i.e., 100° C. for water, 82° C. for acetonitrile, 78° C. for ethanol). For a single solvent system (at least among the three solvents cited), the normal boiling point of that solvent is the preferred upper limit. If one wishes to operate at higher temperatures (e.g., the above solvents under pressure or higher boiling analogs), one should keep below the melting point of the anticipated product since the likelihood of decompositional side reactions increases at higher temperatures. This is particularly true when using solvolytic solvents so that nucleophilic displacement of substituent groups is minimized. A practical safe upper limit would be 150° C.

Formation of large crystals is customarily favored by mixing reagents at an elevated temperature and cooling at a slow rate without mechanical mixing, e.g., at a minimum cooling rate of 3° C. per hour, i.e., mix at about 100° C. and then cool to room temperature during the succeeding 24 hours. Holding at the high temperature for too long may allow side reactions to occur to an undesirable extent. Cooling much below room temperature is not especially desirable even in the organic systems, but 5° C. is a practical lower limit. Should microcrystals be desired, reactants should be dissolved singly at the lowest temperatures which will give about a 0.1 molar solution, then mixed rapidly with vigorous agitation and rapid cooling. Before mixing, the individual reactant concentration should be between about 0.001 and 0.1 molar.

The second broad class of the HCBD anion-radical salts, i.e., those containing the combined neutral HCBD, will be prepared under temperature and concentration conditions, and in general using the same solvent systems, as already discussed in detail for the simple anion-radical salts. In most instances, these salts involving the combined neutral HCBD will be more readily obtained with the organic cations. With such cations, this type of salt is normaly obtained directly by reaction of the source of the organic cation, e.g., a substituted quaternary ammonium halide, with HCBD directly. The most useful halides, by virtue of solubility and reactivity considerations, are the iodides. With these, since the by-product of the reaction is iodine, it is generally preferred to use a large excess of the quaternary ammonium iodide reactant so as to permit scavenging of the liberated iodine in the form of the substituted $I_3^-$ anion.

Another general method for the formation of these HCBD anion-radical salts containing portions of combined neutral HCBD involves interaction of a salt of 1,1,2,3,4,4-hexacyano-2-butene and HCBD, for instance, according to the following equation:

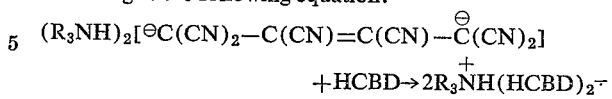

$+HCBD \rightarrow 2R_3NH(HCBD)_2^-$

In the case of the inorganic HCBD anion-radicals containing the combined neutral HCBD, these products are obtainable most conveniently by iodide discharge from the necessary iodide in reaction with HCBD in organic systems. The complex inorganic cation ion-radical salt with combined neutral HCBD can also be prepared by the reaction of HCBD in organic systems on the preformed simple anion-radical. Simple metathesis of an an alkali metal HCBDide in all instances results only in formation of the simple anion-radical salt involving cation exchange. Generally speaking, with the organic cations, the formation of a complex salt containing combined neutral HCBD will be favored over the simple anion-radical salts and will form in any synthesis system involving neutral HCBD. Rare instances will occur where the simple anion-radical salt will be favored and in these instances formation thereof can be enhanced by using an excess of the cation precursor. Of course, it is within the purview of the present invention to prepare first simple anion-radical salts and convert these, if desired, to the more complex salt containing combined neutral HCBD simply by the addition to the requisite portions of the HCBD required to a solution of the simple anion-radical charge-transfer salt.

By virtue of their generically deep colors, the single crystals of the HCBD/Lewis base charge-transfer compounds find utility as the coloring material in marking instruments such as a conventional pencil type wherein the fabricated single crystal serves as the equivalent of the lead. By virtue of the strong broad absorption in the near infrared region, particularly for the most desirable HCBD/Lewis base charge-transfer compounds which exhibit a detectable paramagnetic resonance absorption, marks made by such marking instruments are readily and easily copied by the desirable cheap thermographic processes. In the larger single-crystal form, the HCBD/Lewis base charge-transfer compounds, because of their attractive shape and appearance, being colored yet highly reflective on some of the crystal planes, find use as decorative materials, e.g., as the equivalent of gem stones in jewelry, and the like. Similarly, in the smaller single-crystal form, the HCBD/Lewis base charge-transfer compounds find artistic and decorative utility, for instance, as pearlescent materials in otherwise colorless plastics, or pearlescent pigment materials for decorative lacquers and plastic solutions.

As stated in the foregoing, the present invention is generic to the charge-transfer compounds of HCBD with Lewis bases. These charge-transfer compounds vary in structure and properties, primarily as a function of the relative base strengths of the Lewis bases involved, and accordingly include these compounds which are probably more properly referred to as complexes wherein in the equilibrium stable state there is little or no detectable charge transfer between the Lewis acid component, i.e., HCBD, and the Lewis base component. These materials are believed to be properly describable as pi complexes involving semibonding atomic orbital overlap between the pi orbitals of the Lewis acid and Lewis base components.

The more important charge-transfer compounds of HCBD are the charge-transfer compounds wherein in the ground equilibrium state there exists a formalized charge transfer between the Lewis acid and Lewis base components. In these compounds, an electron has been donated by the Lewis phase component and accepted by the Lewis acid component, i.e., the HCBD component, and accordingly in the equilibrium representation of the ground state of such compounds, the HCBD component exists on an equilibrium basis in the form of the corresponding anion radical or HCBDide, i.e., HCBD⁻·. Depending on the base strength of the Lewis acid components in these charge-transfer compounds, there are two normal types of such compounds. The first of these are those with the moderately strong Lewis bases, which are best describable as the simple anion-radical salts, wherein, on a stoichiometric basis to attain equilibrium electronic neutrality in the said charge-transfer compounds, the overall molecular structure of said compounds will consist of the cation involved (or cations) in the case of mixed salts and the HCBDide in amount such as to give electronic neutrality in the over-all salt.

The second of these are the complex anion-radical salts wherein, in addition to the requisite numbers of the HCBD anion radicals to assure electronic neutrality to the over-all charge-transfer compound, there are also present one or more molar proportions of bound or combined HCBD which, while bound into the molecular structure of the said complex anion-radical salt, are still electronically neutral as contrasted to the just-described necessary electronically balancing anion radicals. While it is not known with any certainty, it is believed that the anion-radical HCBDide moieties are bound into the over-all molecular structure of the complex anion-radical salts by formal electronic equilibrium bondings to the cation, and that the bound or combined neutral molecules of HCBD are bound into the over-all molecular structure of the complex anion-radical salts through pi orbital overlaps of the said neutral moieties with the said anion-radical moieties.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the class consisting of 1,1,2,3,4,4-hexacyano-2-butene, the Group Ia, Ib and IIa metal and the tetra(lower alkyl)ammonium salts of 1,1,2,3,4,4-hexacyano-2-butene, hexacyano-1,3-butadiene, and the charge-transfer compounds of hexacyano-1,3-butadiene with Lewis bases.

2. 1,1,2,3,4,4-hexacyano-2-butene.

3. The dipotassium salt of 1,1,2,3,4,4-hexacyano-2-butene.

4. The disodium salt of 1,1,2,3,4,4-hexacyano-2-butene.

5. Hexacyano-1,3-butadiene.

6. Charge-transfer compounds of hexacyano-1,3-butadiene with Lewis bases.

7. Charge-transfer compounds as set forth in claim 6 in which the Lewis bases are selected from the class consisting of
   (1) metals
   (2) salts of 1,1,2,3,4,4-hexacyano-2-butene
   (3) metal salts
   (4) tertiary amines
   (5) aromatic hydrocarbons and
   (6) aromatic hydrocarbons containing electron-donating substituents.

8. Charge transfer compounds of the formula $$(M^{+n})_x[(HCBD)_y^{-\cdot}]^{nx}$$

wherein $n$ is the formal positive charge on the Lewis base cation M, from 1 to 6, $x$ is the number of cation species present, from 1 to 6 and which in the plural instance includes mixed individual cations, HCBD represents the hexacyano-1,3-butadiene moiety, ⁻ indicates a negative ionic charge and · an electron, $y$ is the number of negative charged HCBD species present, from 1 to 6, and $nx$ is the total negative charge on the charged HCBD moieties.

9. Charge-transfer compounds of the formula $$(M^{+n})_x[(HCBD)_y^{-\cdot}]^{nx}(HCBD)_z^{°}$$

wherein $n$ is the formal positive charge on the Lewis base cation M, from 1 to 6, $x$ is the number of cation species present, from 1 to 6 and which in the plural instance includes mixed individual cations, HCBD represents the hexacyano-1,3-butadiene moiety, ⁻ indicates a negative ionic charge and · an electron, $y$ is the number of negatively charged HCBD species present, from 1 to 6, $nx$ is the total negative charge on the charged HCBD moieties, ° represents a neutral HCBD moiety, and $z$ is the total number of neutral HCBD moieties present.

10. The charge-transfer compounds of claim 9 in which more than one electron has been transferred in at least one HCBD moiety and wherein $z$ is a number of 1 to 6 inclusive.

11. Charge-transfer compounds of the formula

wherein HCBD represents the hexacyano-1,3-butadiene moiety, the aromatic compound moiety represents a member selected from the class consisting of aromatic hydrocarbons and aromatic hydrocarbons with electron-donating substituents, and $n$ is the number of aromatic compound moieties, from 1–3.

12. The compound of the formula

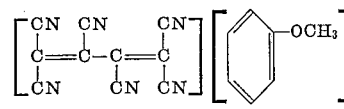

13. A process for preparing hexacyano-1,3-butadiene which comprises heating, at a temperature within the range of 30° to 250° C., a member selected from the class consisting of metal tetracyanoethylenides and metal salts of symmetrical tetracyanoethane, said metal being an element selected from the class consisting of the elements of Groups Ia, Ib and IIa, and oxidizing the resultant product.

14. A process for preparing the charge-transfer compounds of claim 8 which comprises contacting hexacyano-1,3-butadiene with an equivalent amount of a member selected from the class consisting of
   (1) metals
   (2) salts of 1,1,2,3,4,4-hexacyano-2-butene
   (3) inorganic metal salts and
   (4) tertiary amines.

15. A process for preparing the charge-transfer compounds of claim 9 which comprises contacting an excess amount of hexacyano-1,3-butadiene with a member selected from the class consisting of
   (1) metals
   (2) salts of 1,1,2,3,4,4-hexacyano-2-butene
   (3) inorganic metal salts and
   (4) tertiary amines.

16. A process for preparing the charge-transfer compounds of claim 11 which comprises dissolving hexacyano-1,3-butadiene in a member selected from the class consisting of nonsubstituted aromatic hydrocarbons and aromatic hydrocarbons containing electron-donating substituents.

17. The disilver salt of 1,1,2,3,4,4-hexacyano-2-butene.

18. The bis(tetraethylammonium) salt of 1,1,2,3,4,4-hexacyano-2-butene.

References Cited by the Examiner

UNITED STATES PATENTS 2,766,246  10/56  Middleton _____ 260—429
3,097,221  7/63   Wiley _____ 260—429.7

OTHER REFERENCES

McKusick et al., "Chem. & Eng. News," pp. 118 and 119 (Apr. 11, 1960).

TOBIAS E. LEVOW, *Primary Examiner.*